(12) United States Patent
Popescu et al.

(10) Patent No.: US 7,813,149 B2
(45) Date of Patent: Oct. 12, 2010

(54) SYSTEM AND METHOD FOR POWER SAVING CONVERSION TOPOLOGY IN SWITCH MODE POWER SUPPLIES

(75) Inventors: Lucian Popescu, Austin, TX (US); Constantin D. Livescu, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 354 days.

(21) Appl. No.: 11/859,525

(22) Filed: Sep. 21, 2007

(65) Prior Publication Data

US 2009/0080222 A1 Mar. 26, 2009

(51) Int. Cl.
*H02M 3/335* (2006.01)

(52) U.S. Cl. .................... 363/21.05; 363/21.07

(58) Field of Classification Search ............ 363/20, 363/21.01, 21.05, 21.07, 21.09, 21.13, 21.15, 363/21.17, 95, 97, 131
See application file for complete search history.

(56) References Cited

U.S. PATENT DOCUMENTS

| | | | |
|---|---|---|---|
| 6,169,680 B1 * | 1/2001 | Matsui et al. | 363/21.05 |
| 6,487,097 B2 | 11/2002 | Popescu | |
| 7,061,780 B2 * | 6/2006 | Yang et al. | 363/21.16 |
| 7,218,541 B2 | 5/2007 | Price et al. | |
| 7,589,983 B1 * | 9/2009 | Lin et al. | 363/21.13 |
| 2007/0046105 A1 | 3/2007 | Johnson et al. | |

* cited by examiner

*Primary Examiner*—Matthew V Nguyen
(74) *Attorney, Agent, or Firm*—Larson Newman & Abel, LLP

(57) ABSTRACT

A power supply includes an input filter and rectifier module, a digital control module, and a converter module. The input filter and rectifier module is configured to rectify an input voltage. The digital control module is adapted to prevent a potential saturation of a transformer by setting a maximum allowable duty cycle for a control signal transmitted to the transistor based on an input voltage. The digital control model is further adapted to reduce switching losses in the power supply by setting the control signal switching frequency, based on the input voltage. The converter module is configured to convert the input voltage into a direct current output voltage based upon the control signal.

12 Claims, 5 Drawing Sheets

SYSTEM AND METHOD FOR POWER SAVING CONVERSION TOPOLOGY IN SWITCH MODE POWER SUPPLIES

FIELD OF THE DISCLOSURE

This disclosure relates generally to power supplies, and relates more particularly to a system and method for power saving conversion topology in switch mode power supplies.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems.

Typically, computer systems rely on switch mode power supplies to assure the hardware interface between the available power sources (E.g. AC power grid) and the information handling system components. Modern switch mode power supplies are required to achieve high efficiency performance in order to meet the increased demand for energy efficient power conversion solutions. One of the main factors affecting performance efficiency is the switching losses of the DC-DC converter primary transistor or transistors in the power supply. The power loss due to the switching process is proportional to the squared value of the bulk voltage and the switching frequency applied to the DC-DC converter. The power loss varies dramatically for topologies not using active power factor correction (PFC) and where the power supplies are subjected to a wide input voltage variation.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application.

Figure 1:
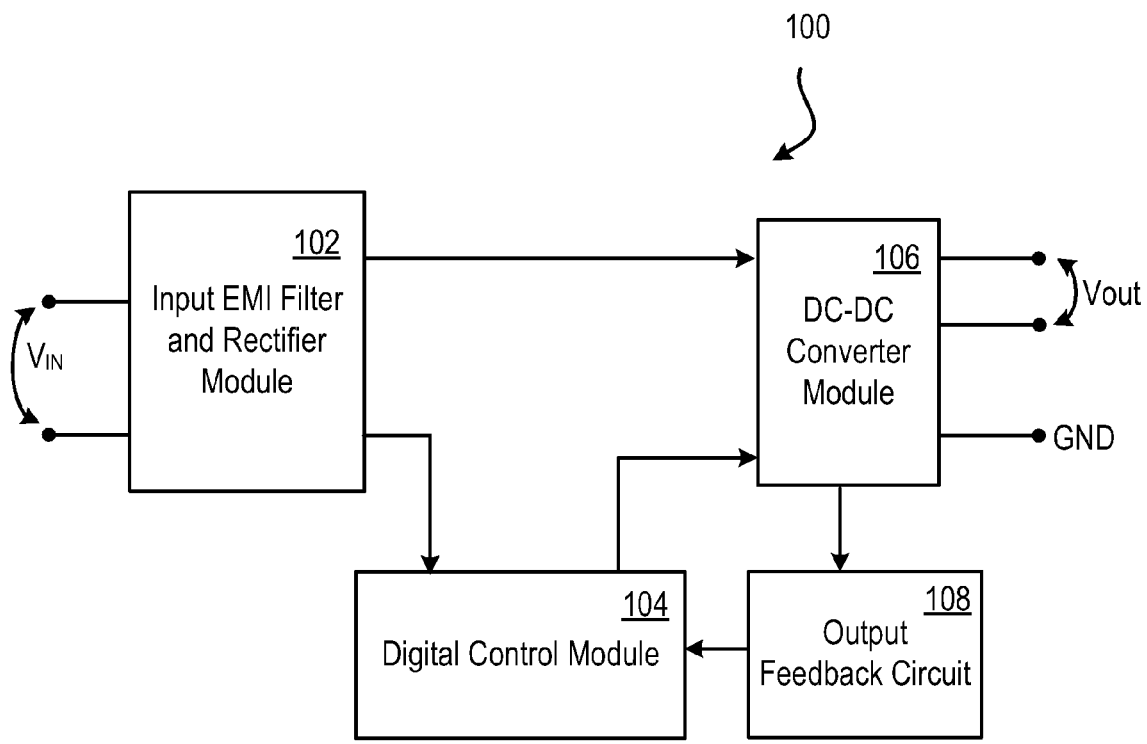
FIG. 1 is a block diagram of a particular embodiment of a power supply.

FIG. 1 shows an embodiment of a power supply device 100 including an input electromagnetic interference (EMI) filter and rectifier module 102, a digital control module 104, a DC-DC converter module 106, and an output feedback circuit 108. The input EMI filter and rectifier module 102 preferably includes a first input terminal coupled to a first voltage reference, labeled $V_{IN}$, a second input terminal also coupled to the first voltage reference, and first and second output terminals. The digital control module 104 can include a first input terminal coupled to the second output terminal of the input EMI filter and rectifier module 102, a second input terminal, and an output terminal. The DC-DC converter module 106 preferably includes a first input terminal coupled to the first output terminal of the input EMI filter and rectifier module 102, and a second input terminal coupled to the first output terminal of the digital control module 104. The DC-DC converter module 106 can also include a first output terminal, second and third output terminals coupled to a second voltage reference, labeled $V_{OUT}$, and a fourth output terminal coupled to a third voltage reference, labeled GND. The output feedback circuit 108 can include an input terminal connected to the first output terminal of the DC-DC converter module 106, and an output terminal connected to the second input terminal of the digital control module 104.

The input EMI filter and rectifier module 102 preferably receives an input voltage, rectifies the input voltage, and filters any electronic noise in the input voltage generated by the power supply device 100. The rectified input voltage can be applied to the first input terminal from the DC-DC converter 106. The digital control module 104 preferably measures the input voltage and receives a feedback signal from the output feedback circuit 108, based on an output voltage and an output current of the DC-DC converter module 106. Based on the input voltage, the digital control module 104 sets both a maximum allowable duty cycle and a switching frequency for a control signal applied to the DC-DC converter module 106. Based on the feedback signal from the output feedback circuit 108, the digital control module 104 continuously adjusts the duty cycle of the control signal. The digital control module 104 sends the control signal to the DC-DC converter module 106, to enable the DC-DC converter module to regulate the rectified input voltage from the input EMI filter and rectifier module 102 to a direct current (DC) voltage. After regulating the input voltage, the DC-DC converter module 106 supplies a DC output voltage to various components attached to the power supply 100.

Figure 2:
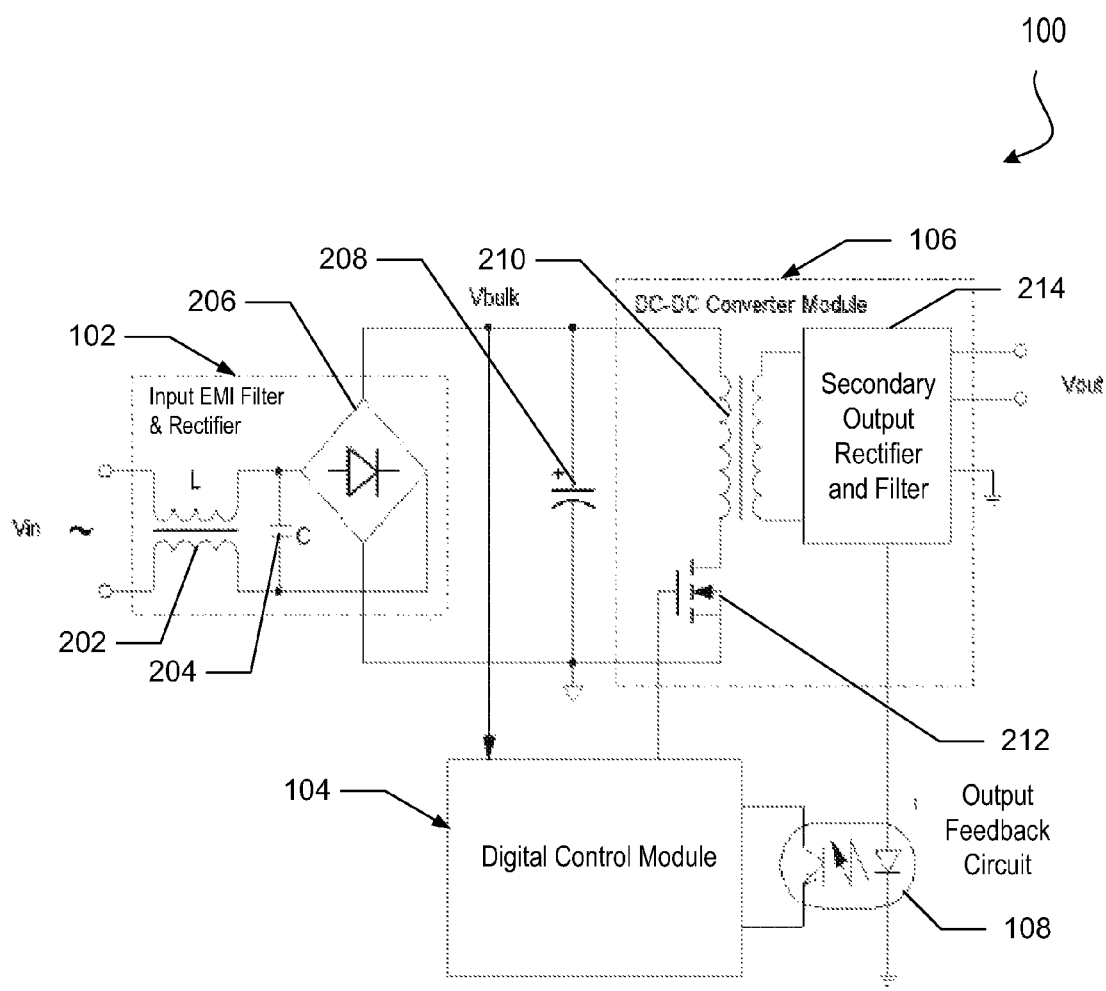
FIG. 2 is a combined circuit and block diagram of the power supply.

FIG. 2 shows the power supply device 100 in greater detail. The input EMI filter and rectifier module 102 preferably includes an inductor 202, a first capacitor 204, and a diode bridge 206. The inductor 202 can be a common-mode inductor or any similar type of inductor. The inductor 202 preferably connects to the first voltage reference, $V_{IN}$. The first capacitor 204 includes a first terminal and a second terminal connected to the inductor 202. The diode bridge 206 includes a first terminal connected to the first terminal of the first capacitor 204, a second terminal connected to the second terminal of the first capacitor, a third terminal, and a fourth terminal. The second capacitor 208 includes a first terminal connected to the third terminal of the diode bridge 206 and a second terminal connected to the fourth terminal of the diode bridge. The digital control module 104 preferably includes a first input terminal coupled to the third terminal of the diode bridge 206, a second input terminal, a third input terminal, and an output terminal.

The DC-DC converter module 106 preferably includes a transformer 210, a transistor 212, and an output rectifier module 214. The transformer 210 includes a primary winding and a secondary winding. The primary winding of the transformer 210 includes a first terminal connected to the first terminal of the second capacitor 208 and a second terminal. The secondary winding of the transformer includes a first terminal and a second terminal. The transistor 212 includes a first current electrode connected to the second terminal of the primary winding of the transformer 210, a second current electrode connected to the fourth terminal of the diode bridge 206, and a control electrode connected to the output terminal of the digital control module 104. The output rectifier module 214 includes a first terminal connected to the first terminal of the secondary winding of the transformer 210, a second terminal connected to the second terminal of the secondary winding of the transformer 210, a third terminal connected to the third voltage reference, first and second voltage output terminals coupled to the second voltage reference, $V_{OUT}$, and an output terminal. The power supply device 100 can also include the output feedback circuit 108 having a first input terminal connected to the output terminal of the output rectifier module 214, a second input terminal connected to the third voltage reference, a first output terminal connected to the second input terminal of the digital control module 104, and a second output terminal connected to the third input terminal of the digital control module.

The inductor 202 of the input EMI filter and rectifier module 102 can receive the input voltage, $V_{IN}$, and apply the input voltage to the diode bridge 206. The inductor 202 and the first capacitor 204 preferably filter the electronic noise from the input voltage created by the power supply device 100. Upon receiving the input voltage, the diode bridge 206 preferably rectifies and the second capacitor 208 filters the input voltage in a well-known fashion, at which point the rectified input voltage can be applied to the transformer 210. The digital control module 104 preferably transmits a control signal to the transistor 212 based upon the input voltage level, labeled $V_{bulk}$, measured between the third and the fourth terminals of the diode bridge 206. The control signal makes the transistor 212 conductive/non-conductive according to a duty cycle and a switching frequency set for the control signal by the control module 104.

As the input voltage increases, the switching frequency of the control signal can be lowered to increase the efficiency of the power supply device 100. However, a maximum magnetic core flux density can increase when the input voltage is increased and the switching frequency is lowered, causing a potential saturation of the transformer 210 and a potential failure of the transistor 212. Thus, to prevent the potential saturation of the transformer 210 and the potential failure of the transistor 212, without having to increase the size of the magnetic core, the maximum magnetic core flux density should be held constant for different input voltage levels and switching frequencies of the control signal. The maximum magnetic core flux density $B_{max}$ can be calculated using the following equation:

$$B_{max} = (V_{BULKmax} \times t_{ONmax})/(N_p \times A_{min}) = (V_{BULKmax} \times D_{max})/(N_p \times A_{min} \times f_{SW})$$

where $B_{max}$ is the maximum magnetic core flux density of the transformer 210, $V_{BULKmax}$ is the maximum input bulk voltage applied to the transformer, $t_{ONmax}$ is the maximum allowable ON time of the transformer, $N_p$ is the number of turns of the primary winding of the transformer, $A_{min}$ is the magnetic core minimum cross-section area of the transformer, $D_{max}$ is the maximum allowable duty cycle, and $f_{SW}$ is the switching frequency of the control signal applied to the transistor 212.

As shown in the equation above, to keep the maximum magnetic core flux density $B_{max}$ constant as the maximum input bulk voltage $V_{BULKmax}$ is increased and the switching frequency $f_{SW}$ is decreased, the maximum allowable duty cycle $D_{max}$ should be decreased accordingly. Thus, the digital control module 104 sets the maximum allowable duty cycle and switching frequency for the control signal based on the input voltage level $V_{bulk}$, measured at the third terminal of the diode bridge 206. Without affecting the maximum power capability of the power supply device 100, both the maximum allowable duty cycle $D_{max}$ and the switching frequency $f_{SW}$ can be decreased during higher maximum input bulk voltages $V_{BULKmax}$.

The current associated with the rectified input voltage can flow through the transformer 210 and the transistor 212 based upon the control signal sent from the digital control module 104 to the transistor. As current passes through the primary winding of the transformer 210, an output voltage is produced on the secondary winding. The output voltage from the secondary winding can be filtered and regulated by the output rectifier module 214 prior to being supplied to a plurality of devices connected to the power supply device 100. The output feedback circuit 108 measures the output voltage and output current from the output rectifier module 214, and provides a feedback signal to the digital control module 104 based on the measurements. Upon setting the maximum allowable duty cycle and the switching frequency of the control signal, the digital control module 104 further adjusts the duty cycle based on the feedback signal received from the output feedback circuit 108. The feedback signal enables the digital control module 104 and the DC-DC converter module 106 to combine and produce the correct output voltage and current.

Benefits of lowering the switching frequency of the control signal at high input voltage levels can include lowering power dissipation in the transistor 212, the output rectifier module 214, and snubbering circuits associated with the switching components of the power supply device 100. Additional benefits can include using smaller heatsinks and allowing smaller maximum voltage requirements for the transistor 212 and the output rectifier module 214, as well as decreasing the output voltage noise and electromagnetic interference.

Figure 3:
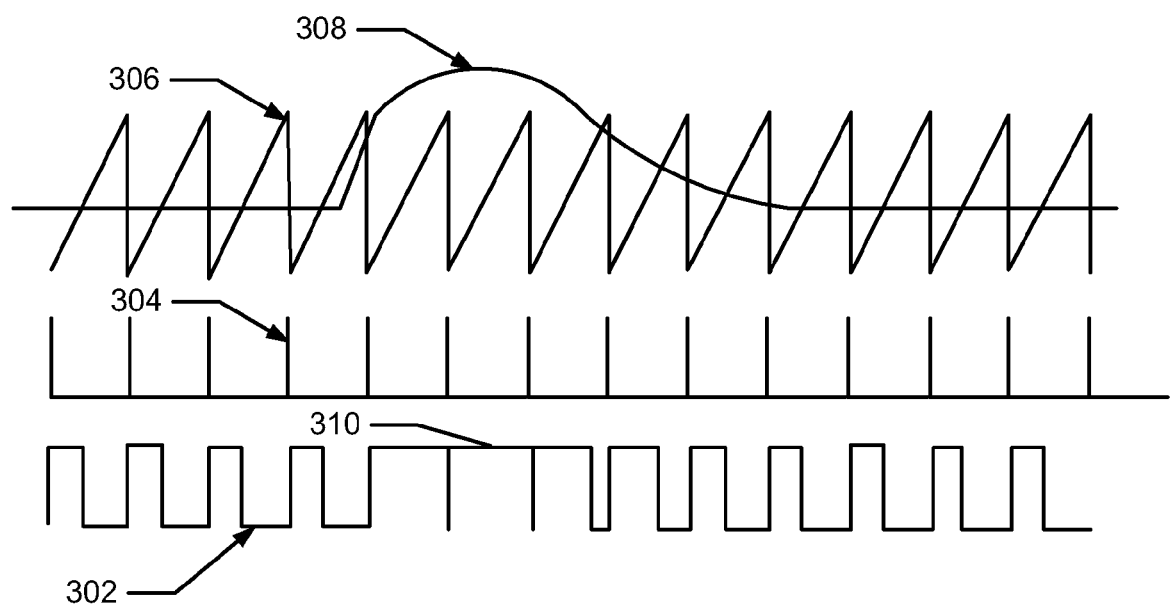
FIG. 3 is a graph of a plurality of waveforms associated with a switch mode power supply.

FIG. 3 shows a graph of a plurality of waveforms associated with a power supply device without the digital control module 104 setting a maximum allowable duty cycle for a control signal 302. The plurality of waveforms includes the control signal 302, an internal clock 304, an internal voltage 306, and a feedback control signal 308. The digital control module 104 uses the internal clock 304, the internal voltage 306, and the feedback control signal 308 from the output feedback circuit 108 to form the control signal 302. The internal clock 304 and the internal voltage 306 can be adjusted according to the change needed in the switching frequency of the control signal 302. To correct for an increase of current needed during a transient event, such as an increase in an output load or a decrease in the input voltage, the feedback control signal 308 can over-shoot resulting in a potential saturation of the transformer 210, as indicated by a potential saturation region 310 of the control signal 302. During the potential saturation region 310 the control signal 302 can continuously be in a high state, which results in the transistor 212 being continuously conductive. Thus, the current associated with the input voltage can continuously flow through the transformer 210, resulting in the potential saturation of the transformer and the failure of the transistor 212.

Figure 4:
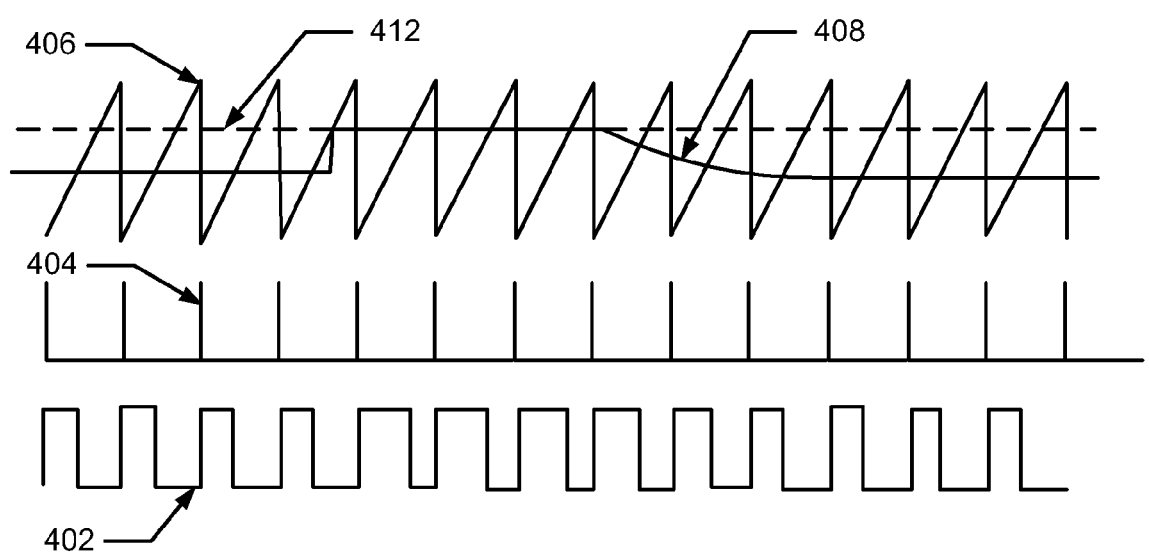
FIG. 4 is a graph of a plurality of waveforms associated with a digital control module in the power supply of FIG. 2.

FIG. 4 shows a graph of a plurality of waveforms associated with the digital control module 104. The plurality of waveforms includes a control signal 402, an internal clock 404, an internal voltage 406, and a feedback control signal 408. To form the control signal 402, the digital control module 104 uses the internal clock 404, the internal voltage 406, and the feedback control signal 408 from the output feedback circuit 108. As stated above, the digital control module 104 can set the maximum allowable duty cycle level 412 to prevent the potential saturation of the transformer 210 and the potential failure of the transistor 212. During a transient event in the feedback signal 408, the digital control module clamps the feedback signal. Clamping the feedback signal prevents the duty cycle of the control signal 302 from increasing to a level above the maximum allowable duty cycle 412, and ensures that the transformer 210 will not saturate, and the transistor 212 will not fail.

Figure 5:
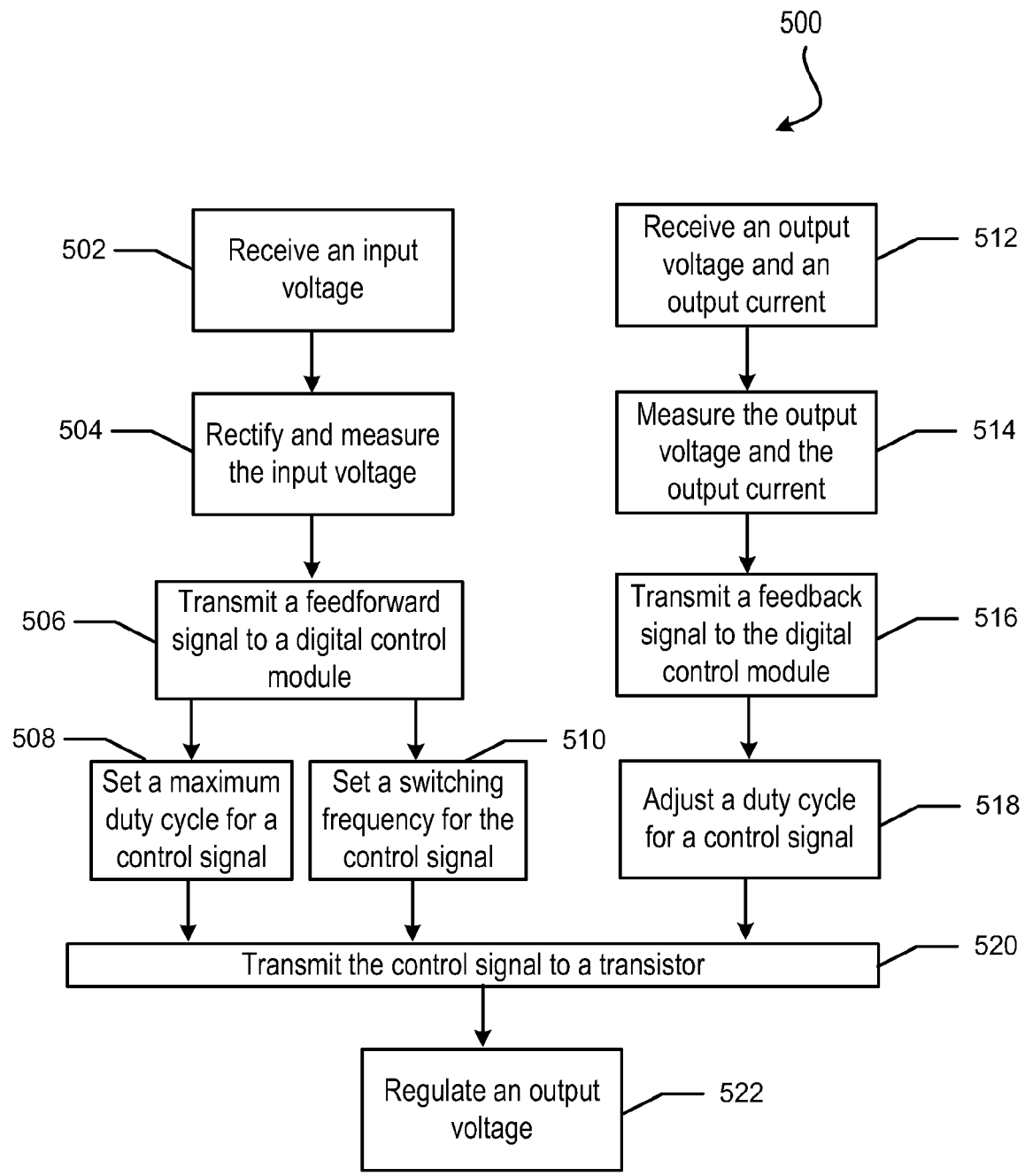
FIG. 5 is a flow chart of a method for regulating an output voltage in the power supply of FIG. 2.

FIG. 5 shows a flow chart of a particular embodiment of a method 500 for regulating a direct current (DC) output voltage. At block 502, a power supply device receives an input voltage. The input voltage is preferably an alternating current (AC) voltage. The power supply rectifies and measures the input voltage at block 504. At block 506, a feed-forward signal is transmitted to the digital control module. At block 508, the digital control module sets the maximum allowable duty cycle for a control signal. At block 510, the digital control module sets the switching frequency of the control signal. At block 512, an output feedback circuit receives an output voltage and an output current of the power supply, and at block 514, the output voltage and output current are measured. At block 516, the output feedback circuit transmits a feedback signal to the digital control module. At block 518, the digital control module continuously adjusts the duty cycle of a control signal. At block 520, the control signal is sent to a transistor, which is used to regulate the output voltage at block 522.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A power supply device comprising:
a diode bridge including a first terminal coupled to a first voltage reference, a second terminal coupled to a second voltage reference, a third terminal, and a fourth terminal;
a transformer including a primary winding having a first terminal coupled to the third terminal of the diode bridge and a second terminal;
a transistor including a first current electrode coupled to the second terminal of the primary winding of the transformer, a second current electrode coupled to the fourth terminal of the diode bridge, and a control electrode; and
a digital control module including a first input terminal coupled to the third terminal of the diode bridge, and an output terminal coupled to the control electrode of the transistor, the control module adapted to prevent a potential saturation of the transformer by setting a maximum allowable duty cycle and a switching frequency for a control signal transmitted to the transistor, based on an input voltage, the digital control module decreasing the maximum allowable duty cycle in response to a high input voltage level.

2. The power supply device of claim 1 wherein the digital control module is adapted to reduce an amount of power dissipation by lowering the switching frequency in response to a high input voltage level.

3. The power supply device of claim 1 further comprising:
an output rectifier module including a first input terminal coupled to a first terminal of a secondary winding of the transformer, a second input terminal coupled to a second terminal of the secondary winding of the transformer, and a first output terminal connected to a third voltage reference, the output rectifier configured to supply a direct current output voltage.

4. The power supply device of claim 3 further comprising:
an output feedback circuit including an input terminal coupled to a second output terminal of the output rectifier module and an output terminal coupled to a second input terminal of the digital controller, the output feedback circuit configured to transmit a feedback signal to the digital control module.

5. The power supply device of claim 4 wherein the digital control module is further adapted to adjust duty cycle based on the feedback signal.

6. The power supply device of claim 1 wherein the digital control module is further adapted to prevent a potential failure of the transistor by decreasing the maximum allowable duty cycle in response to a high input voltage level.

7. A power supply device comprising:
an input filter and rectifier module including a first input terminal coupled to a first voltage reference, a second input terminal coupled to the first voltage reference, a first output terminal, and a second output terminal, the input filter and rectifier module configured to rectify an input voltage;
a digital control module including a first input terminal coupled to the second output terminal of the input filter and rectifier module, and an output terminal, the digital control module adapted to prevent a potential saturation of a transformer by setting a maximum allowable duty cycle and a switching frequency for a control signal transmitted to the transistor based on an input voltage, and further adapted to lower the switching frequency of the control signal in response to a high input voltage; and
a converter module including a first input terminal coupled to the first output terminal of the input filter and rectifier module, a second input terminal coupled to the output terminal of the digital control module, a first output terminal coupled to a second voltage reference, a second output terminal coupled to the second voltage reference, and a third output terminal coupled to a third voltage reference, the converter module configured to convert the input voltage into a direct current output voltage based upon the control signal.

8. The power supply device of claim 7 wherein the digital control module is adapted to lower the maximum allowable duty cycle in response to a high input voltage.

9. The power supply device of claim 7 wherein the digital control module is further adapted to reduce an amount of power dissipation in response to lowering the switching frequency of the control signal in response to the high input voltage.

10. The power supply device of claim 7 further comprising:
an output feedback circuit including an input terminal coupled to a fourth output terminal of the converter module, and an output terminal coupled to a second input terminal of the digital control module, the output feedback circuit configured to transmit a feedback signal to the digital control module.

11. The power supply device of claim 10 wherein the digital control module is further adapted to adjust a duty cycle of the control signal based on the feedback signal.

12. The power supply device of claim 7 wherein the digital control module is further adapted to prevent a potential failure of the transistor by decreasing the maximum allowable duty cycle in response to a high input voltage level.

* * * * *